(12) United States Patent　　(10) Patent No.: US 12,515,385 B2
Gleason　　(45) Date of Patent: Jan. 6, 2026

(54) APPARATUS AND METHOD FOR MAKING MOLDED PRODUCTS

(71) Applicant: Composite Technologies International, LLC, Anniston, AL (US)

(72) Inventor: Stephen S. Gleason, Burr Ridge, IL (US)

(73) Assignee: Composite Technologies International, LLC, Anniston, AL (US)

( * ) Notice: Subject to any disclaimer, the term of this patent is extended or adjusted under 35 U.S.C. 154(b) by 182 days.

(21) Appl. No.: 18/466,172

(22) Filed: Sep. 13, 2023

(65) Prior Publication Data

US 2023/0415388 A1　Dec. 28, 2023

Related U.S. Application Data

(63) Continuation-in-part of application No. 17/558,022, filed on Dec. 21, 2021, now Pat. No. 11,787,094.

(51) Int. Cl.
*B29C 45/00*　(2006.01)
*B29K 101/10*　(2006.01)
*B29K 105/00*　(2006.01)
*B29K 309/08*　(2006.01)

(52) U.S. Cl.
CPC ...... *B29C 45/0001* (2013.01); *B29K 2101/10* (2013.01); *B29K 2105/0014* (2013.01); *B29K 2309/08* (2013.01)

(58) Field of Classification Search
CPC ............ B29C 2045/465; B29C 64/165; B29C 70/305; B29C 70/30; B29C 44/367; B29C 44/36; B29C 41/365; B29C 41/36; B29C 2033/3864; B29C 70/48; B29C 45/02; B29C 45/0005; B29C 45/0001
See application file for complete search history.

(56) References Cited

U.S. PATENT DOCUMENTS 3,318,826 A　5/1967　Bridgeford
4,233,203 A　11/1980　Baumgardt
(Continued)

FOREIGN PATENT DOCUMENTS

WO　2019118965 A1　6/2019
WO　2020131095 A1　6/2020

OTHER PUBLICATIONS

Https://www.freemansupply.com/Products/Tooling-Plastics-Fillers/Cotton-Flock; Freeman Manufacturing and Supply Company Product Webpage for "Cotton Flock"; Jun. 2021.

*Primary Examiner* — Stella K Yi
(74) *Attorney, Agent, or Firm* — Neustel Law Offices

(57) ABSTRACT

An apparatus and method for making molded products for marine, automotive, recreational, and other applications. The apparatus and method for making the molded products generally includes a closed mold and an inline mixer for adding a catalyst to a filled resin. The method may include adding a fiber material to a resin to create the filled resin, adding a catalyst to the filled resin, and mixing the catalyst and the filled resin to create an uncured catalyzed, filled resin. The method may also include adding the uncured catalyzed, filled resin to a mold and allowing the uncured catalyzed, filled resin to harden in the mold.

26 Claims, 9 Drawing Sheets

(56) References Cited

U.S. PATENT DOCUMENTS

| | | | | |
|---|---|---|---|---|
| 4,824,017 A | * | 4/1989 | Mansfield | B29B 7/7452 |
| | | | | 239/296 |
| 5,380,776 A | | 1/1995 | Hibbert | |
| 8,915,996 B2 | | 12/2014 | Novak | |
| 9,217,072 B2 | | 12/2015 | Novak | |
| 10,612,237 B1 | | 4/2020 | Gleason | |
| 11,008,438 B2 | | 5/2021 | Gleason, Sr. | |
| 2006/0086826 A1 | * | 4/2006 | Oden | B29B 7/90 |
| | | | | 239/428 |
| 2008/0154002 A1 | * | 6/2008 | Nava | C08L 67/08 |
| | | | | 526/236 |
| 2010/0019405 A1 | | 1/2010 | Eberth | |
| 2011/0059143 A1 | | 3/2011 | Iavarone | |
| 2012/0010332 A1 | | 1/2012 | Spradlin | |
| 2014/0203468 A1 | | 7/2014 | Humphries | |
| 2019/0184365 A1 | | 6/2019 | Gleason | |
| 2020/0232218 A1 | | 7/2020 | Gleason | |
| 2021/0277204 A1 | | 9/2021 | Gleason | |

\* cited by examiner

APPARATUS AND METHOD FOR MAKING MOLDED PRODUCTS

CROSS REFERENCE TO RELATED APPLICATIONS

The present application is a continuation-in-part application of, and claims priority to, U.S. patent application Ser. No. 17/558,022, filed Dec. 21, 2021. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to an apparatus and method for making molded products for use in forming or reinforcing products and structures with composite material.

Related Art

Any discussion of the related art throughout the specification should in no way be considered as an admission that such related art is widely known or forms part of common general knowledge in the field.

There has been a recent increase in the acceptance of Light RTM process over traditional RTM process for closed molds used in the manufacture of fiber reinforced composites. The light RTM process has overtaken other processes in many typical automotive, industrial, and marine molding applications. The increased popularity of light RTM is due at least in part to the lower tooling cost of Light RTM. Currently, molds used with light resin transfer mold (RTM) processes use relatively high amounts of fiberglass when high-strength molded parts are desired. These molds are presently preloaded with fiberglass mat that is cut to size and placed in the mold prior to adding resin matrix material. Typically, 5-7 layers of fiberglass are required, depending on the size of the mold/part to be produced.

The current process for producing parts using light RTM is slow and labor intensive, and the use of fiberglass mat is a significant factor contributing to the time and labor required to make parts using the light RTM process.

SUMMARY

An example embodiment is directed to an apparatus and method for making molded products. An example embodiment of the method for making molded products generally includes adding a fiber material, such as a natural or synthetic flock fiber, microfiber, nanofiber, or other short-strand fiber material, to a resin to create a filled resin, and adding a catalyst to the filled resin. The resin can be pumped directly from a container, and the catalyst can be added using an inline mixer, for the step of mixing the catalyst and the filled resin to create an uncured catalyzed, filled resin. The process proceeds by adding the uncured catalyzed, filled resin to a mold (the mold being free of a reinforcing fiberglass mat), and then allowing the uncured catalyzed, filled resin to harden in the mold.

The method can also be used to reinforce products, without a mold. An example embodiment such a use also generally includes adding fiber material, such as a natural or synthetic a flock fiber, microfiber, nanofiber, or other short-strand fiber material, to a resin to create a filled resin, and adding a catalyst to the filled resin. The resin can be pumped directly from a container, and the catalyst can be added using an inline mixer, for the step of mixing the catalyst and the filled resin to create an uncured catalyzed, filled resin. The process proceeds by applying the uncured catalyzed, filled resin to a surface or area (the surface or area being free of a fiberglass mat), and then allowing the uncured catalyzed, filled resin to harden.

There has thus been outlined, rather broadly, some of the embodiments of the apparatus and method for making molded products in order that the detailed description thereof may be better understood, and in order that the present contribution to the art may be better appreciated. There are additional embodiments of the apparatus and method for making molded products that will be described hereinafter and that will form the subject matter of the claims appended hereto. In this respect, before explaining at least one embodiment of the apparatus and method for making molded products in detail, it is to be understood that the apparatus and method for making molded products is not limited in its application to the details of construction or to the arrangements of the components set forth in the following description or illustrated in the drawings. The apparatus and method for making molded products is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
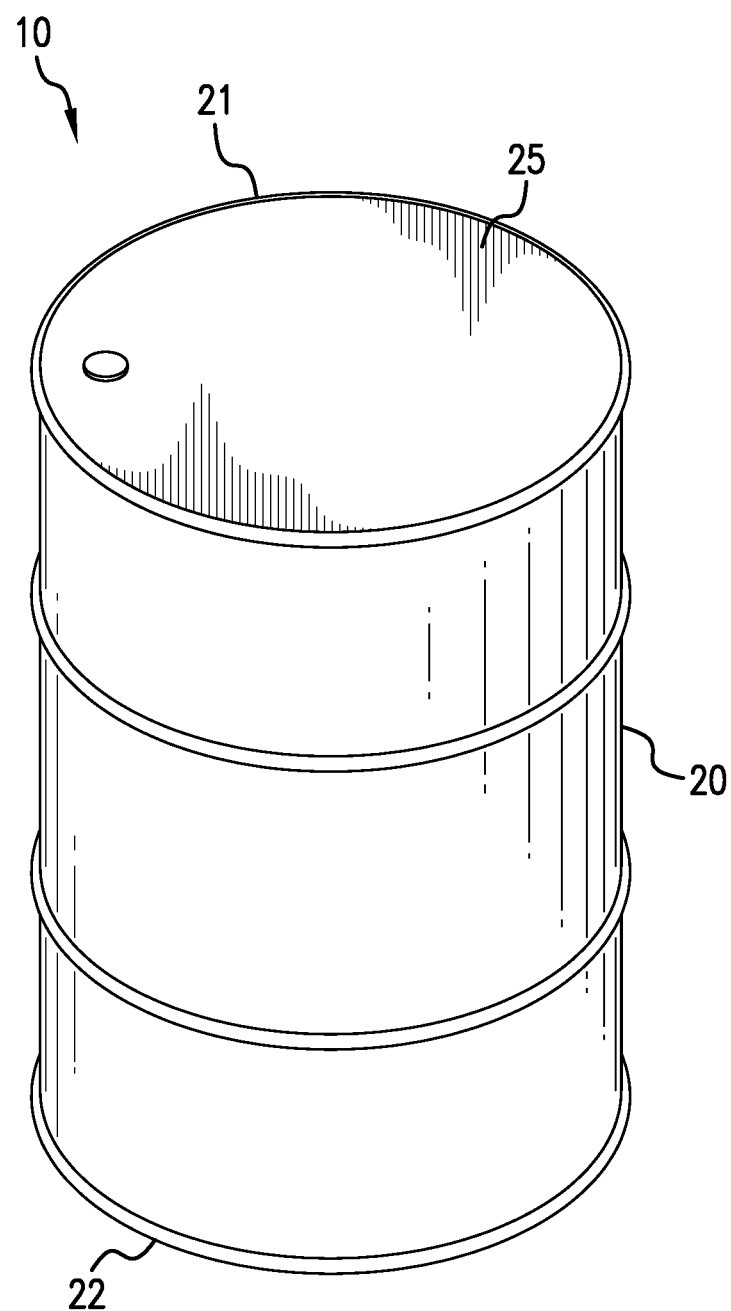
FIG. 1 is a perspective view of a container for storing a filled resin mixture in accordance with an example embodiment.
Figure 2:
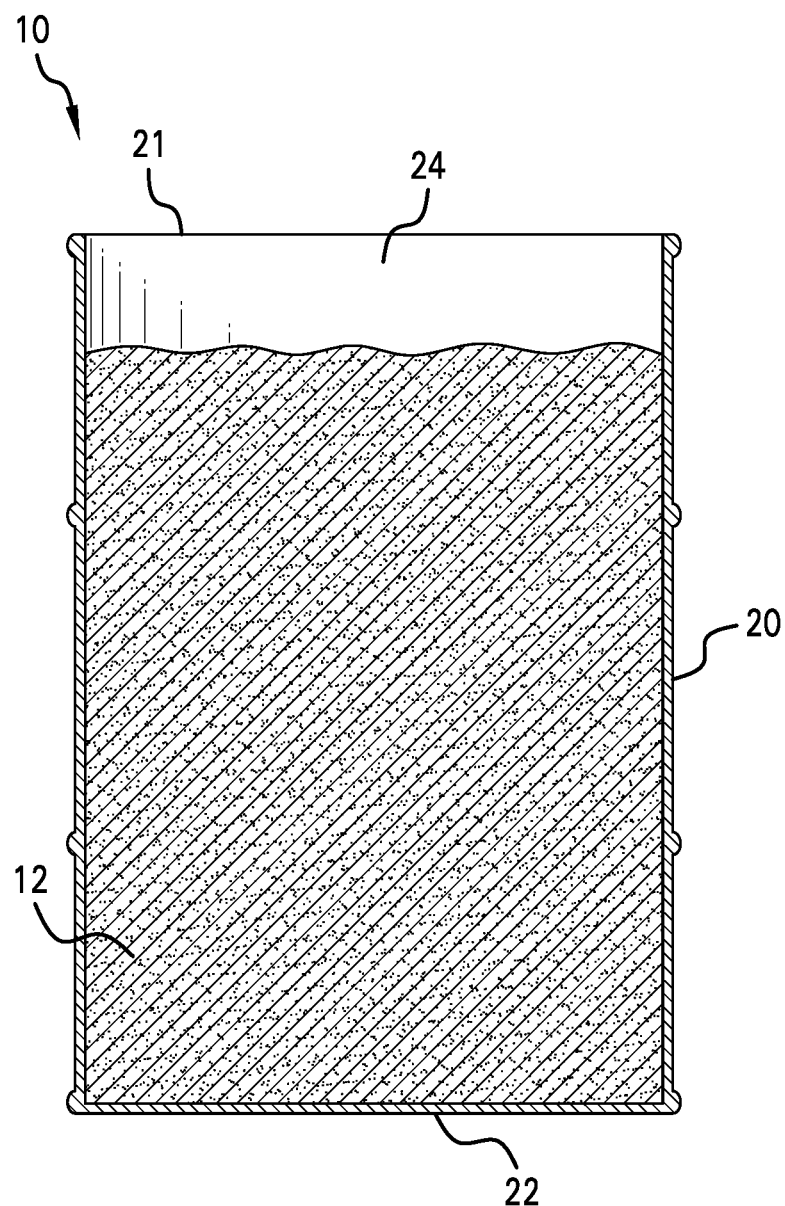
FIG. 2 is a sectional view of a container storing a filled resin in accordance with an example embodiment.

An example embodiment apparatus and method for making molded products generally comprises a package 10 for containing and shipping a filled resin 12. The filled resin 12 may be held in a container 20 including an upper end 21, a lower end 22, an opening 24, and a cavity 26, wherein the opening 24 leads to the cavity 26. The filled resin can be withdrawn from the container 20, such as by placing it into a smaller container, pumping it into a hose 50, etc. The filled resin 12 may be comprised of several materials, including resin 15 (which may be referred to as an encapsulating resin), optional microspheres 16, and additive 17. The additive 17 may further include cotton flock and calcium sulfate, which together may comprise the additive 17. In certain embodiments, the cotton flock of the additive 17 is replaced or combined with a different fiber material such as a different natural or synthetic flock fiber material, a microfiber material, a nanofiber material, and/or another short-strand fiber material; a combination of fiber materials without the cotton flock is also possible.

The filled resin 12 may include microspheres, although they are optional. The microspheres 16 may comprise plastic microspheres 16. Each of the plurality of microspheres 16 may comprise a polymer shell encapsulating a gas. The additive 17 may comprise a fiber material and a filler material, such as a mineral filler. The mineral filler material may comprise calcium sulfate, although other known minerals may also be used. The fiber material can comprises a cotton flock, a different natural or synthetic flock material, a microfiber material, a nonfiber material, and/or another short-strand fiber material, or a combination thereof.

The resin 15 may comprise a polymerized product of polyester resins, a polymerized product of vinyl ester resins, or a combination thereof. The resin 15 may comprise a density higher than one gram per cubic centimeter and the additive may comprise a density lower than one gram per cubic centimeter, although other densities are possible—for example, if microspheres are not used, or are used in a lower concentration, the density of the additive may be greater.

Some example embodiments in general include a method of making a molded part. The method includes adding a fiber material to a resin 15 to create a filled resin 12; adding a catalyst 31 to the filled resin 12; mixing the catalyst 31 and the filled resin 12 to create a catalyzed, filled resin 13; adding the catalyzed, filled resin 13 to a mold 40 or 70, and allowing the catalyzed, filled resin 13 to harden or cure in the mold.

The method may further comprise the step of pumping the filled resin 12 into a hose 30. In addition, adding the catalyst 31 may comprise the step of introducing the catalyst 31 to a flow of the filled resin 12. A catalyst reservoir and pump 32 can be used to force the catalyst into the flow of filled resin 12. The step of mixing the catalyst 31 comprises using an inline mixer 34 in the flow path of the filled resin 12.

The process can be carried out using a closed mold 40 (or a squish mold 70), as stated above. The mold may also be or comprise a clamshell mold having an empty cavity, such as cavity 48 of mold 40. The step of adding the uncured catalyzed, filled resin to the mold may comprise withdrawing or pumping the catalyzed, filled resin 13 into the empty mold cavity. To assist the process, or as an alternative, a vacuum can be drawn on the mold cavity using a vacuum pump 50 and a vacuum line 52, fluidly connected to the mold cavity 48.

In some example embodiments, the filled resin comprises calcium sulfate, and the catalyst comprises MEKP (methyl ethyl ketone peroxide), benzoyl peroxide (BPO) or other thermoset resin initiator/catalyst. The filled resin 12 may comprise a weight percentage of about 60% polyester resin, and the additive 17 may comprise a weight percentage of about 30% calcium sulfate, and a weight percentage of about 10% fiber material, wherein the fiber material comprises cotton flock. In certain embodiments, the 10% cotton flock is replaced with a weight percentage of about 10% of a different natural or synthetic flock fiber material, a microfiber material, a nanofiber material, and/or another short-strand fiber material, or a combination thereof.

In another example embodiment, the filled resin 12 may comprise a weight percentage of about 80% polyester resin, and the additive 17 may comprise a weight percentage of about 10% calcium sulfate (and/or other mineral fillers), and a weight percentage of about 7-10% fiber material, such as cotton flock. The cotton flock may comprise cotton fibers having an average length of about 380 microns. In certain embodiments, the 7-10% cotton flock is replaced with a weight percentage of about 7-10% of a different natural or synthetic flock fiber material, a microfiber material, a nanofiber material, and/or another short-strand fiber material, or a combination thereof.

In some embodiments, the filled resin 12 comprises a polyester resin, calcium sulfate, and hollow microspheres 16.

In other embodiments, the resin may be withdrawn from a container and applied to a surface, rather than being injected or poured into a mold. Such uses involve withdrawing the filled resin from a container 20 and applying the uncured catalyzed, filled resin 13 to a surface and allowing the uncured catalyzed, filled resin 13 to harden in place. As with the molding process, the surface application process also can include the step of pumping the filled resin 12 into a hose 30. The other steps noted above will still generally apply to the process of applying the filled resin 12 to a surface, and the materials used for the resin 15, additive 17, and catalyst 31 may also be the same. The procedure may also include adding glass fibers 62 to uncured catalyzed, filled resin 13. For example, fiberglass may be added to the resin with a chopper gun, which chops fiberglass and introduces the fibers 62 to a spray of resin that can then cure in place.

B. Resin

The type of encapsulating resin 15 may vary in different embodiments. The encapsulating resin 15 may comprise a highly viscous substance capable of encapsulating the additive 17, and also microspheres 16. The resin 15 may comprise natural substances, synthetic substances, or combinations thereof, including plant and/or synthetic resins. The resin 15 may be selected from the group consisting of polyester resins, vinyl ester resins, epoxy resins, styrene-based resins, and any combinations thereof. The resin 15 may also comprise a fire retardant resin.

The resin 15 may be utilized to impart specific desirable properties to the resulting filled resin 12, including but not limited to fire-retardant properties. The encapsulating resin 15 may be treated with various dyes so as to have a specific color that is desirable for the end use of the resulting filled resin 12, and any molded parts or treated surfaces created from the catalyzed, filled resin 13 once it has cured.

In some example embodiments, the encapsulating resin 15 may comprise a polymerized product of polyester resins having a structure of:

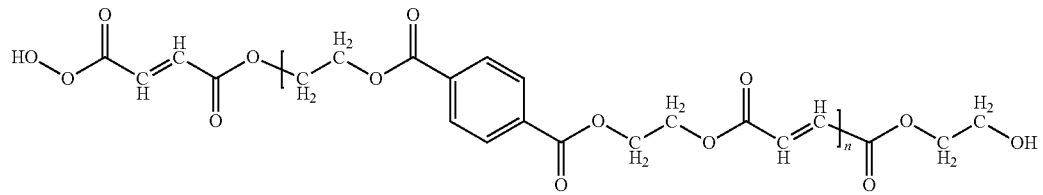

wherein n is from about 3 to about 6. This is just one example of an encapsulating resin 15 and is not meant to be limiting, as other encapsulating resins 15 may be utilized in different embodiments.

By way of a further example, in other embodiments, the resin 15 may comprise a polymerized product of vinyl ester resins having a structure of:

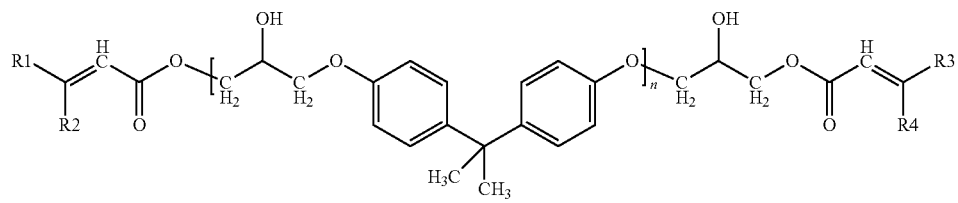

wherein n is 1 to about 2, where $R_1$ is hydrogen or alkyl, $R_2$ is hydrogen or alkyl, $R_3$ is hydrogen or alkyl, $R_4$ is hydrogen or alkyl.

In yet other embodiments, the resin 15 may comprise a polymerized product of a combination of the polyester resins and the vinyl ester resins. The weight percentage of the polyester resin may range from about 5% to about 95%, e.g., 5%, 10%, 15%, 20%, 25%, 30%, 35%, 40%, 45%, 50%, 55%, 60%, 65%, 70%, 75%, 80%, 85%, 90% or 95%. The weight percentage of the vinyl ester resin may range from about 95% to about 5%, e.g., 95%, 90%, 85%, 80%, 75%, 70%, 65%, 60%, 55%, 50%, 45%, 40%, 35%, 30%, 25%, 20%, 15%, 10%, or 5%.

C. Additives

Figure 3:
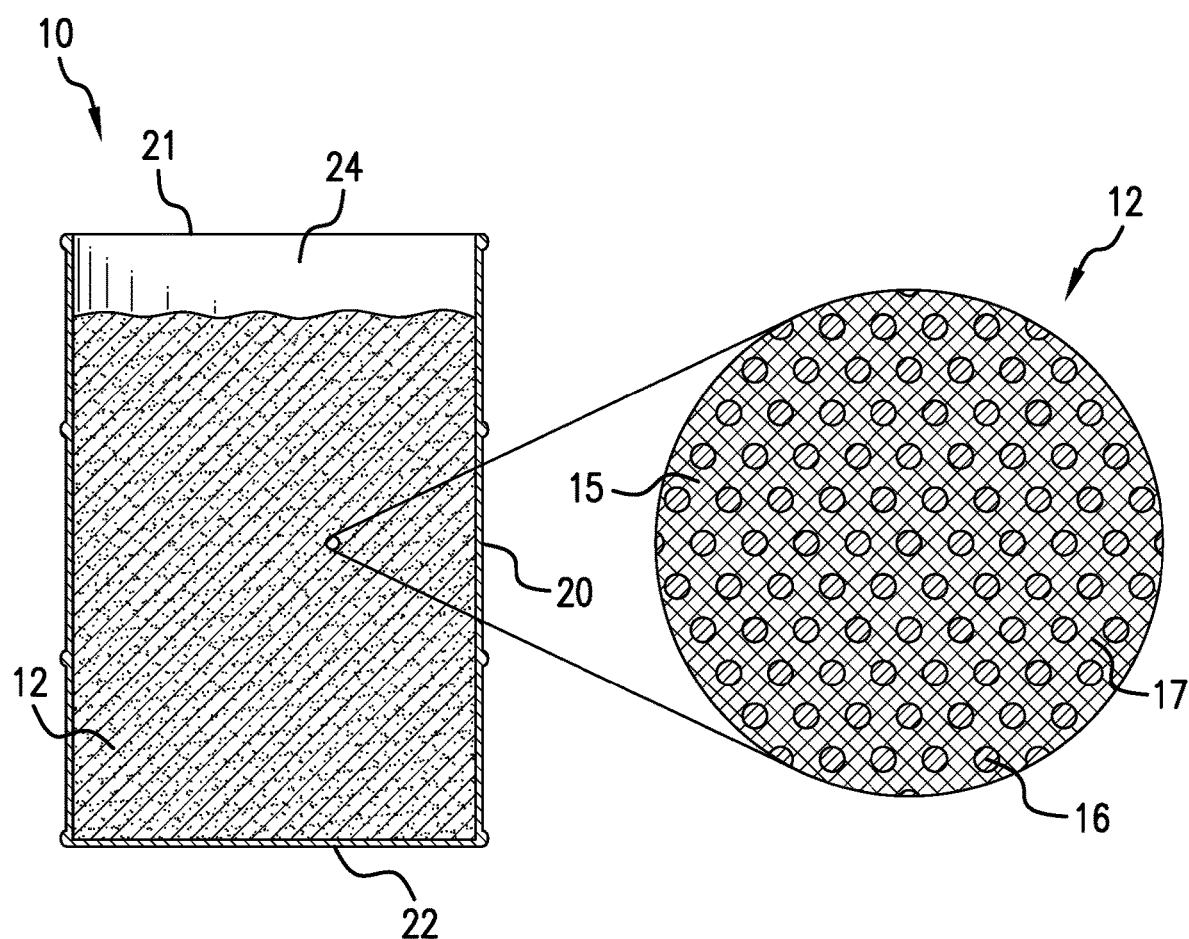
FIG. 3 is a sectional exploded view of a container storing a filled resin in accordance with an example embodiment.

As shown in FIG. 3, the filled resin 12, comprising resin 15, an additive 17, and microspheres 16, if used, may be stored in the container 20. The additive 17 may comprise various materials, including solids, liquids, and combinations thereof.

The additive 17 may comprise various densities and percentages of different materials, depending upon the number and type of any filler materials used, and also depending on whether microspheres 16 are used. In one exemplary embodiment, the additive 17 may comprise about 30% weight percent calcium sulfate, 10% weight percent fiber material, such as cotton flock, and the resin 15 may thus comprise a weight percentage of 60% of the filled resin 12. In certain embodiments, the 10% weight percent cotton flock is replaced by 10% weight percent of a different natural or synthetic flock fiber material, a microfiber material, a nanofiber material, and/or another short-strand fiber material, or a combination thereof. Of course, the use of hollow microspheres 16 will change the weight percentages noted, if they are used. Calcium sulfate has a density of about 3.0 grams per cubic centimeter (g/cm³), and the hollow microspheres 16 have a density of about 0.012 to 0.020 grams per cubic centimeter (g/cm³), so the use of hollow microspheres will not have a large effect on the weight percentages.

In another example embodiment, which may be suitable for spraying, for example, the resin 15 may comprise a weight percentage of about 80%, the cotton flock (and/or a different natural or synthetic flock fiber material, a microfiber material, a nanofiber material, and/or other short-strand fiber material or combination thereof) may have a weight percentage of about 7-10%, and calcium sulfate (and/or other mineral fillers) may have a weight percentage of about 10%.

D. Fiber Material

Figure 4:
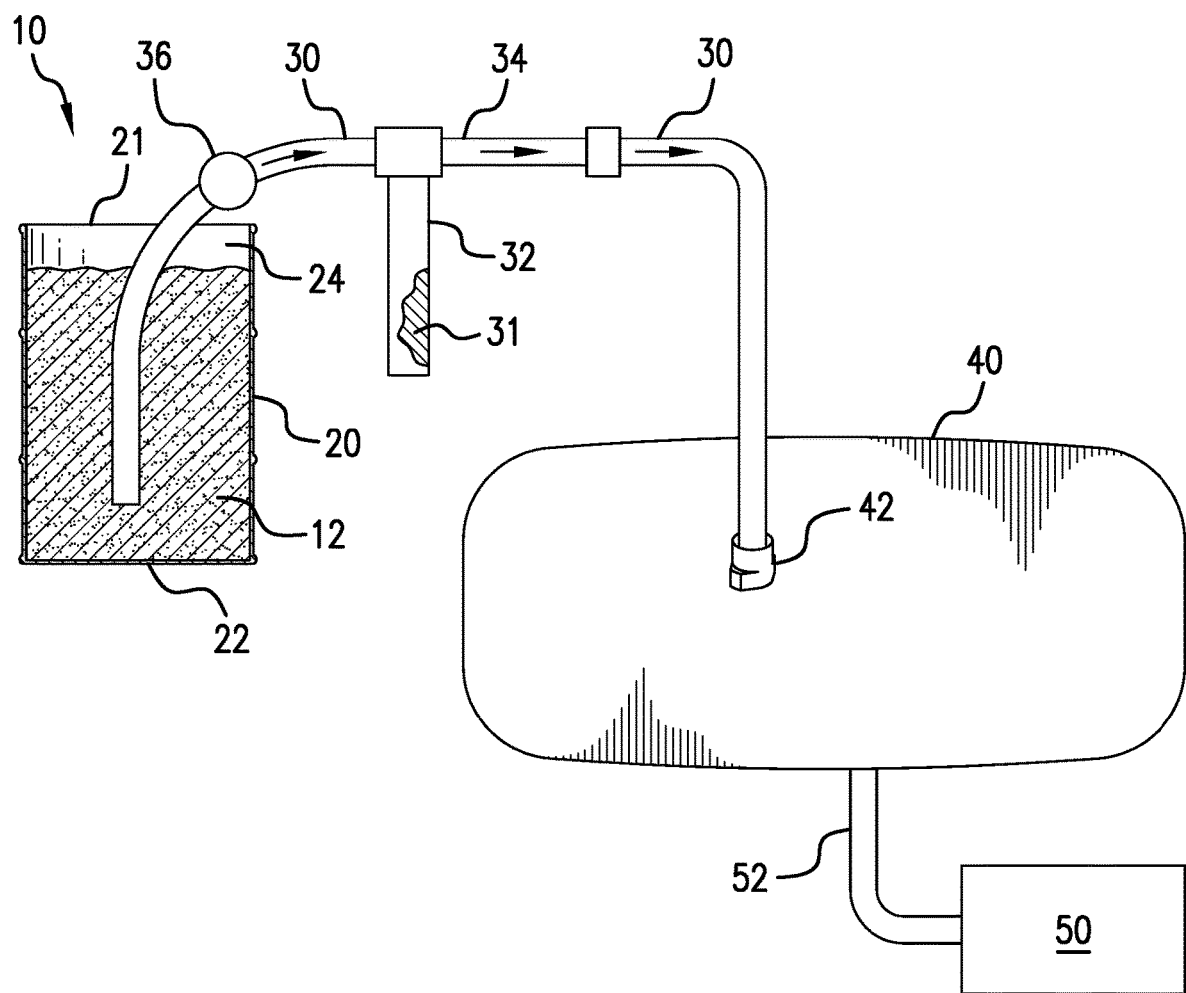
FIG. 4 is a diagrammatic view of a system for using a resin transfer mold in accordance with an example embodiment.
Figure 7:
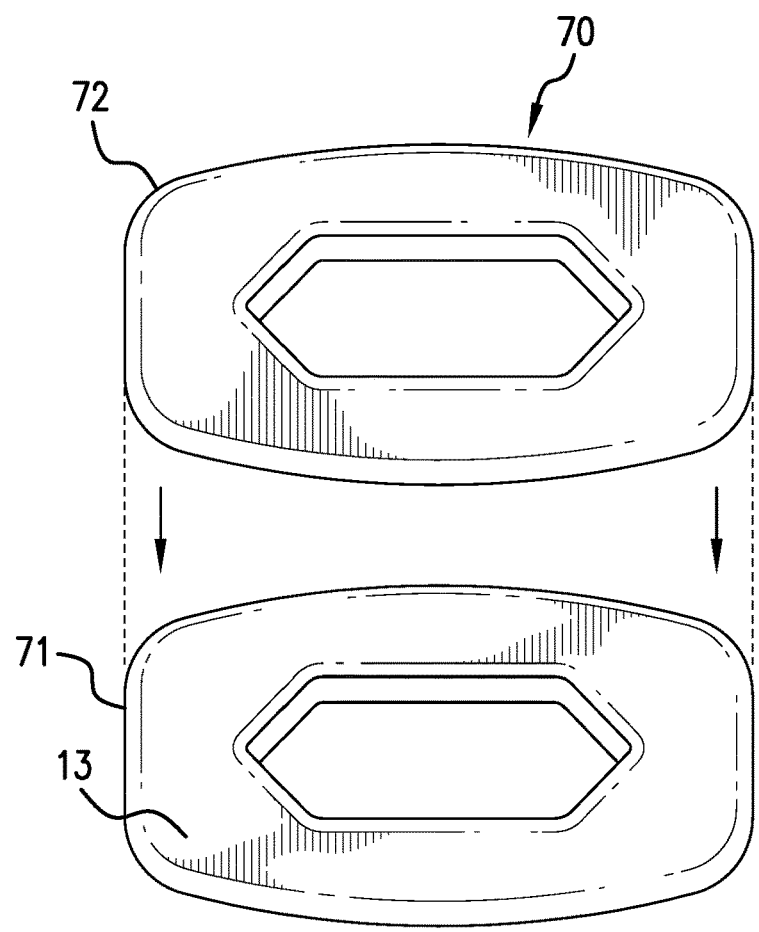
FIG. 7 is another perspective view of a system for using a closed mold in accordance with an example embodiment.
Figure 9:
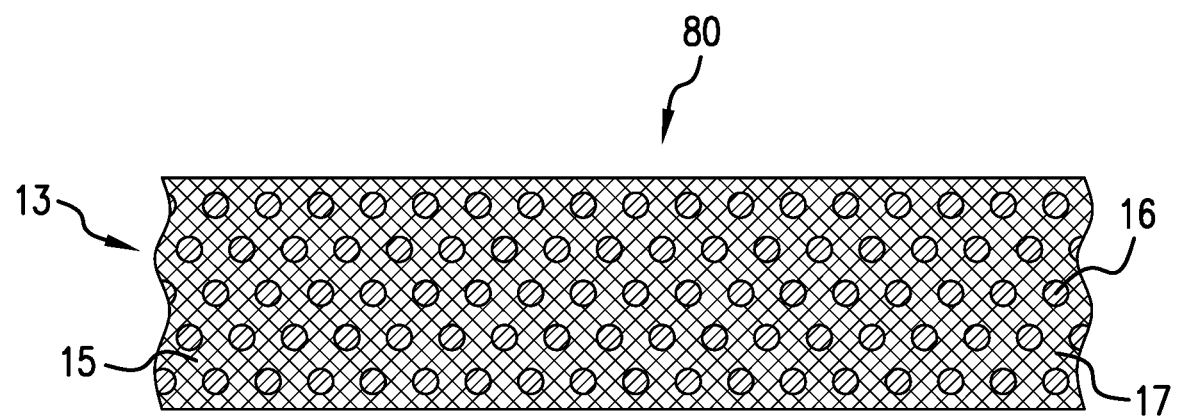
FIG. 9 is a sectional view of a part made using a catalyzed, filled resin in accordance with an example embodiment.
Figure 10:
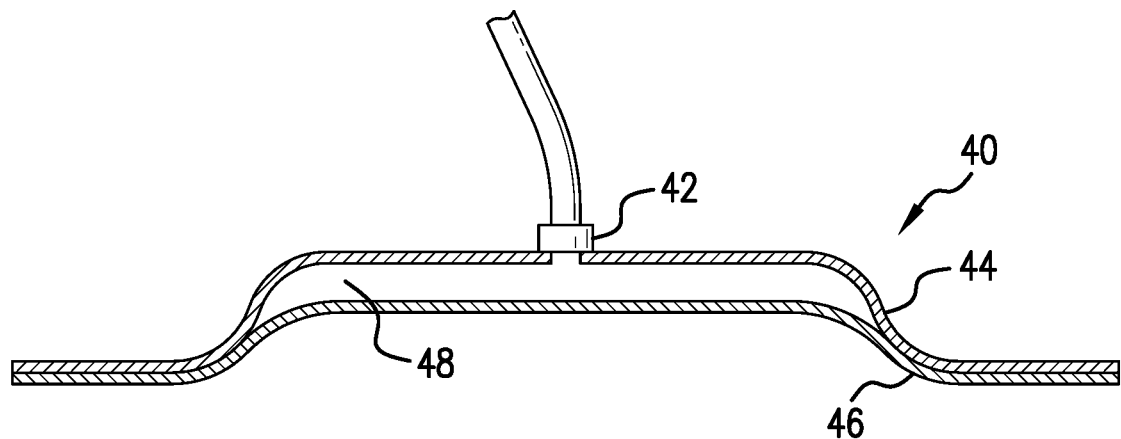
FIG. 10 is a sectional view of a closed mold for use in accordance with an example embodiment.

As discussed above, a fiber material can be added to the resin 15 to create a filled resin 12, which can also contain other materials. It has been found that a fiber material, such as cotton flock (and/or a different natural or synthetic flock fiber material, a microfiber material, a nanofiber material, and/or other short-strand fiber material or combination thereof), added to the polyester resin greatly increases the strength of a molded part, as shown in FIG. 9, for example. The additional strength can eliminate or greatly reduce the need for adding fiberglass mat to a mold (such as molds 40 and 70, as shown in FIGS. 4, 7, and 10). As shown in FIG. 10, the mold cavity 48 can be completely empty, without any reinforcing mat or other materials, prior to injection or introduction of uncured catalyzed, filled resin into the mold. Notably, a synthetic flock fiber can comprise, but is not limited to, one or more of a rayon fiber, a polyester fiber, a nylon fiber, an acrylic fiber, a modacrylic fiber, a polypropylene fiber, or other short-strand synthetic fiber, which can include microfibers and/or nanofibers. Microfibers comprise synthetic fibers with diameters in the micrometer range while nanofibers comprise synthetic fibers with diameters in the nanometer range.

In a specific example using cotton flock as the fiber material, the cotton flock added to resin 15 can comprise ground, random cotton fibers, with a fiber length ranging between 200 and 600 μm, and an average length of about 380 μm. This cotton flock material can weigh between 13.0 and 14.18 lbs./ft.$^3$, and be sized such that >49.0% will pass through a 100 mesh screen.

Alternatively, a different natural flock fiber, a synthetic flock fiber, a microfiber, a nanofiber and/or another short-strand synthetic fiber can be used in place of, or in combination with, the cotton flock fiber wherein the fiber material used preferably has fibers that are of a similar fiber length range, similar average length, similar weight, and similar size as the cotton flock.

E. Microspheres

As best shown in FIG. 3, the filled resin 12 may comprise a plurality of microspheres 16, although microspheres are optional. Various types of microspheres 16 may be utilized, including hollow plastic microspheres 16 comprised of small spherical plastic particles. The microspheres 16 may be comprised of a polymer shell encapsulating a gas. When the gas inside the shell is heated, it increases its pressure and the thermoplastic shell softens, resulting in a dramatic increase in the volume of the microspheres 16. In certain embodiments, when fully expanded, the volume of the microspheres 16 may increase more than about 40 times.

To the naked eye, the microspheres 16 may appear like fine powder. Various sizes of microspheres 16 may be utilized, with typical microspheres 16 ranging from 12 to 300 μm in diameter. It should be appreciated that larger or smaller microspheres 16 may be utilized in different embodiments. The density of hollow plastic microspheres 16 may range from about 0.009 grams per cubic centimeter (g/cm$^3$) to about 0.13 grams per cubic centimeter (g/cm$^3$), though the density could be larger or smaller than that rage in different embodiments.

Hollow plastic microspheres 16 can be used in all standard processing methods for thermoset and thermoplastic composites. Microspheres 16 are produced for a variety of applications using a fairly broad range of materials. Although they have less compressive strength than glass microspheres 16, hollow plastic microspheres 16 offer many of the same advantages as rigid glass microspheres 16 and are among the lightest fillers available. Standard specific gravities are as low as 0.015, providing large volume displacement at a very low weight.

Certain ultra-lightweight hollow plastic microspheres may comprise a density of about 0.020 g/cc. In certain embodiments, the microspheres 16 may comprise a very thin thermoplastic shell (a copolymer, such as vinylidene chloride, acrylo-nitrile or methyl methacrylate) that encapsulates a hydrocarbon blowing agent (typically isobutane or isopentane). When heated, the polymeric shell gradually softens, and the liquid hydrocarbon begins to gasify and expand. When the heat is removed, the shell stiffens and the microsphere remains in its expanded form. Expansion temperatures range from 80° C. to 190° C. (176° F. to 374° F.), depending on the grade. The particle size for expanded microspheres ranges from 20 μm to 150 μm, depending on the grade. When fully expanded, the volume of the microspheres 16 may increase more than 40 times.

Unlike glass microspheres 16, plastic microspheres 16 are much less susceptible to breakage. Excessive pressure will cause the plastic sphere to flatten but not burst. In certain embodiments, such as in sprayed-on applications, the microspheres 16 can deform when the resin is pressurized prior to spraying. After the material hits the surface and returns to ambient pressure, the microspheres 16 will rebound to their spherical shape.

This compressive capability can provide some control over thermal expansion as well. The heat of exotherm during cure can be problematic in composite manufacture. By incorporating plastic microspheres 16, as the part heats up, the resin 15 is able to expand inward, causing the microspheres 16 to compress. Once the heat dissipates, the microspheres 16 rebound. In certain embodiments, the microspheres 16 may retain this flexibility even after cure. Hollow plastic microspheres 16 can be supplied in either expanded or unexpanded form, and may be stored in either form in the container 20.

The most obvious benefit of the hollow microsphere 16 is its potential to reduce part weight, which is a function of density. Compared to mineral-based fillers, such as calcium carbonate, gypsum, mica, silica and talc, hollow plastic microspheres have much lower densities. In certain embodiments, the filled resin 12 may comprise about 1 to about 5 percent by weight hollow plastic microspheres, which can equate to up to 80 percent or more by volume.

As shown in the Figures and described in example embodiments, microspheres 16 may be encapsulated in a resin material to create sheets, panels, or molded structures, for example.

F. Container

As shown in FIGS. 1-5, the filled resin 12, comprised of the resin 15, additive 17, and, if desired, microspheres 16, may be stored and transported in a container 20. Container 20 may be a 55-gallon drum, or other sized or type of container. The makeup of the filled resin 12 is shown in greater detail in FIG. 3. The container and filled resin 12 may be stored as a package 10.

FIGS. 1-5 illustrate an exemplary embodiment of a container 20 comprising an upper end 21, a lower end 22, and an opening 24. A cover 25 may be removably connected to the container 20 so as to selectively enclose the opening 24, such as shown in FIG. 1. The cover 25 may be completely removable from the container 20 or may be partially removable, such as by use of a hinged connection.

As shown in FIG. 4, filled resin 12 can be pumped or extracted directly from container 20 into a hose 30 or a tube, for delivery to a mold 40, through fitting 42. The resin transfer can be effected using a pump 36, and may also be effected by a vacuum pump 50 and vacuum line 52, to draw resin into the mold 40.

G. Operation of Preferred Embodiment

In use, a filled resin 12 may be contained in a container 20. The filled resin may comprise, for example, a weight percentage of about 60% polyester resin, and the additive 17 may comprise a weight percentage of about 30% calcium sulfate (and/or other mineral fillers), and a weight percentage of about 10% cotton material (and/or other natural flock material, synthetic flock material, microfiber, nanofiber, other short-strand fibers, or a combination thereof), wherein the cotton material may comprise cotton flock. The cotton flock may comprise cotton fibers having an average length of about 380 microns.

Figure 5:
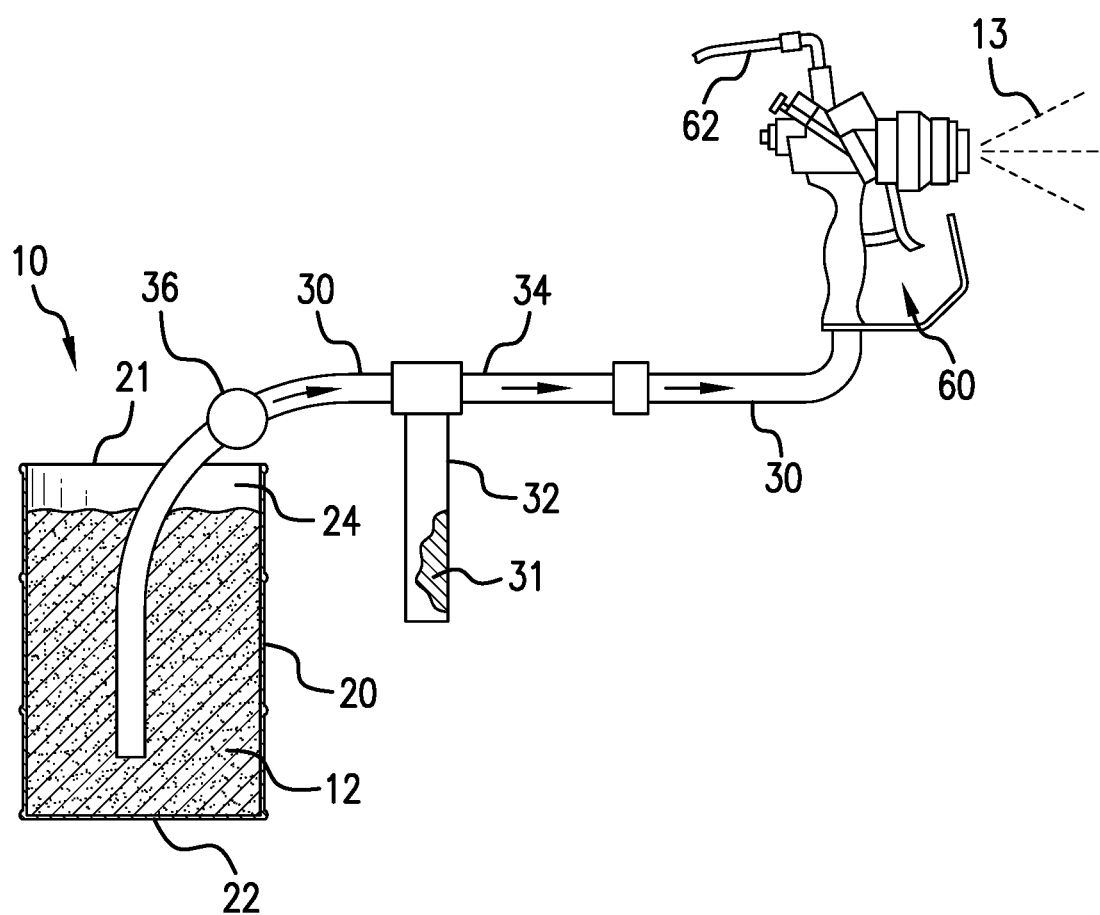
FIG. 5 is a diagrammatic view of a system for applying a resin with a spray gun in accordance with an example embodiment.
Figure 8:
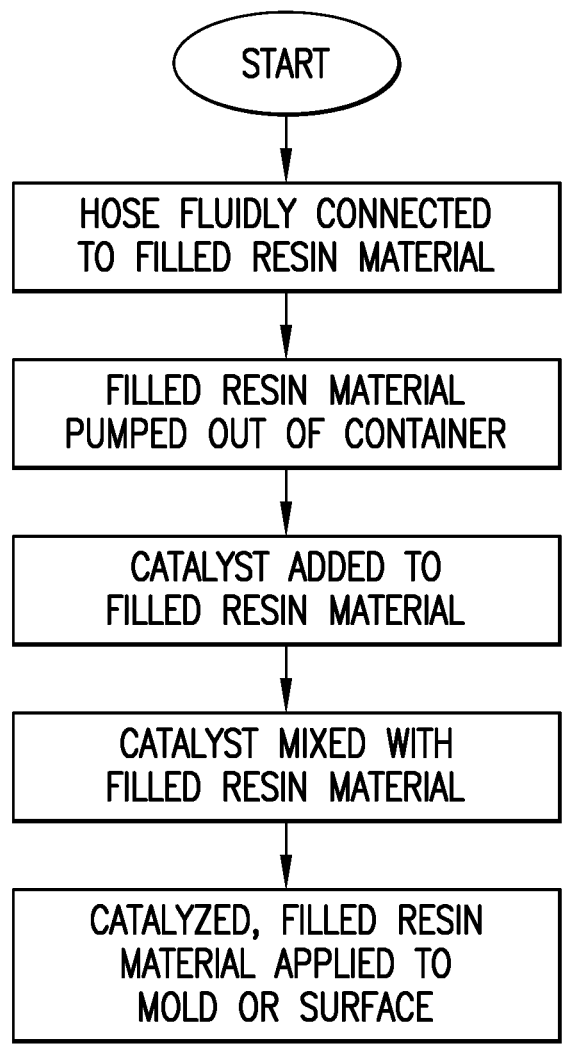
FIG. 8 is a flowchart illustrating steps for applying an uncured catalyzed, filled resin in accordance with an example embodiment.

In an example embodiment, the filled resin 12 may be pumped or otherwise withdrawn from container 20, as shown and described, for example in FIGS. 4-5 and 8. To begin the process, a hose 30 is fluidly connected to the filled resin 12, such as by inserting an end of hose 30 into the container 20 with the filled resin 12. Next, the filled resin 12 is pumped or withdrawn from the container, such as by pump 36. The filled resin 12 may also be removed and placed into a container, for pouring into a mold as shown in FIG. 6.

The filled resin 12 may flow in a path indicated by the arrows in FIGS. 4 and 5, which path can include a pump 36, hose 30, and a static inline mixer 34. As shown in the embodiments of FIGS. 4 and 5, the filled resin 12 may have a catalyst added with an inline catalyzer 32, which pumps or forces catalyst 31 into the flow of filled resin 12. The static inline mixer 34 is attached and in the flow path immediately downstream of catalyzer 32, to ensure thorough mixing of catalyst 31 to the filled resin 12, creating an uncured catalyzed, filled resin 13, which will harden after a certain time when the catalyst 31 has been added. The catalyst 31 may comprise MEKP, benzoyl peroxide (BPO) or other thermoset resin initiator/catalyst, and may be added at a concentration of about 2%. In the process shown in FIG. 4, the uncured catalyzed, filled resin 13 is pumped or drawn into mold 40 through hose 30 and fitting 42, and can be further drawn through vacuum line 52 and vacuum pump 50. The mold 40 comprises two halves, 44 and 46, and a cavity 48, as best shown in FIG. 10.

As mentioned briefly above, the cotton flock (and/or other natural flock material, synthetic flock material, microfiber, nanofiber, other short-strand fibers, or a combination thereof) in additive 17 creates an unexpected effect. Specifically, a molded part made with the filled resin 12 as illustrated and described, for example, in FIGS. 4 and 6-9, is much stronger than a part molded without a fiber material in the additive 17, or with polyester or other resin alone (that is, much stronger than a part would be if molded or formed without additional fiberglass or other material placed in the mold). Accordingly, parts such as part (see FIG. 9) can be molded in a closed mold 40, which is a resin transfer mold, or a mold 70, which is a squish mold, without the need for additional placement of fiberglass or other material into the mold prior to introduction of resin into the mold 40. This eliminates a very time consuming step in the process of molding parts, such as the part 80 as shown in FIG. 9. This part, shown in cross section, comprises catalyzed resin 13, which includes filled resin 15, additive 17, and, optionally, microspheres 16.

Figure 6:
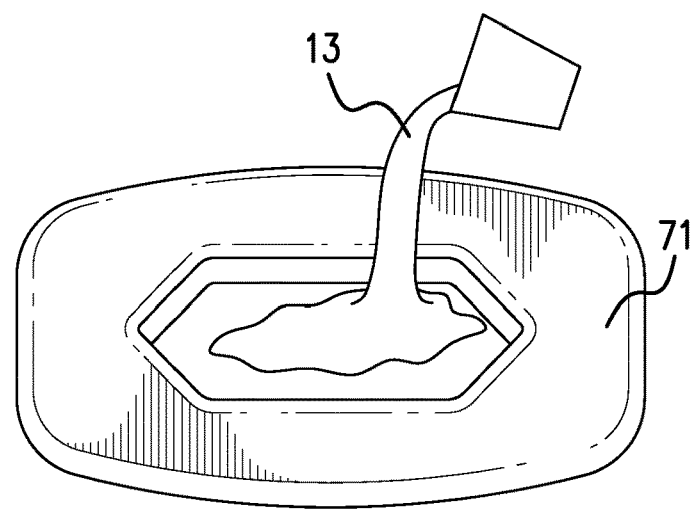
FIG. 6 is a perspective view of a system for using a closed mold in accordance with an example embodiment.

The procedure for making a part with a squish mold 70 is shown in FIGS. 6 and 7. First, filled resin is withdrawn from the container 20. Next, a catalyst is added to the filled resin 12, and the uncured catalyzed, filled resin 13 is added to mold bottom or half 71, and then mold half 72 is placed on top of half 71, after which half 71 can be forced into position so that the molded part will have the proper thickness. The uncured catalyzed, filled resin 13 can be added manually, from a container, or may be pumped into the mold with a nozzle, by an operator. Once the uncured catalyzed, filled resin 13 is in the mold, the mold is left undisturbed so that the uncured catalyzed resin 13 can cure. As with the closed mold 40 procedure described above, parts molded in this way have greater strength than parts without a fiber material (e.g., cotton flock, other natural flock material, synthetic flock material, microfiber, nanofiber, other short-strand fibers, and/or a combination thereof) added. Accordingly, parts can be molded without the use of fiberglass mat added to the mold before introduction of the resin, with the resulting parts still being strong enough for their intended use, which previously required multiple layers of fiberglass to be added to the mold prior to adding resin material.

In addition to molding parts as shown in FIGS. 4 and 6-7 with no fiberglass, parts can also be made, or surfaces can be reinforced, using filled resin 12 containing a fiber material (e.g., cotton flock, other natural flock material, synthetic flock material, microfiber, nanofiber, other short-strand fibers, and/or a combination thereof), while still using fiberglass. As one example, the catalyzed, filled resin 13 can be sprayed onto a part or surface using a chopper gun 60, supplied with fiberglass material 62, as shown in FIG. 5. The equipment used may be mostly conventional, except that, in order to allow the filled resin to flow, it may be desirable to bore out the passages in the chopper gun 60 from $1/8"$ to $3/16"$, for example, and to use larger hoses 30 than those used in conventional applications. In making or reinforcing parts with the equipment and method described in conjunction with FIG. 5, the amount of fiberglass used may be reduced by 50% or more, while maintaining the strength of the part or reinforcement.

As with the closed mold, the filled resin 12 may flow in a path indicated by the arrows in FIG. 5, and the path can include a pump 36, hose 30, and a static inline mixer 34. The filled resin 12 may have a catalyst 31 added with an inline catalyzer 32, which pumps or forces catalyst 31 into the flow of filled resin 12. The static inline mixer 34 is attached to the hose 30 and is in the flow path immediately downstream of catalyzer 32, to ensure thorough mixing of catalyst 31 and the filled resin 12, creating an uncured catalyzed, filled resin 13, which will harden after a certain time when the catalyst 31 has been added. The catalyst 31 may comprise MEKP, benzoyl peroxide (BPO) or other thermoset resin initiator/catalyst, and may be added at a concentration of about 2%. The chopper gun 60 can introduce chopped fiberglass to the uncured catalyzed, filled resin 13 to create a high strength resin material for application to surfaces, molds, etc. The uncured catalyzed, filled resin 13 can also be sprayed directly without the addition of fiberglass, if desired, while the properties noted above are retained by the material.

The part-making process described above can be used for closed molding applications, typically for low to medium volume processes. Some examples of applications for the process and the make-up of the filled resin material include marine hatches and other parts, industrial, automotive, and other parts used in composite molding applications. As stated, the parts that can be molded or reinforced are parts that would have typically included layers of fiberglass reinforcement placed in molds, but which can be made without such reinforcement using the material described herein.

Unless otherwise defined, all technical and scientific terms used herein have the same meaning as commonly understood by one of ordinary skill in the art to which this invention belongs. Although methods and materials similar to or equivalent to those described herein can be used in the practice or testing of the apparatus and method for making molded products, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The apparatus and method for making molded products may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method of making a molded part, comprising:
   withdrawing a filled resin from a container, the filled resin including a flock fiber material, wherein the flock fiber material includes one or both of a natural flock fiber material and a synthetic flock fiber material, and wherein the natural flock fiber material and the synthetic flock fiber material include one or more of nanofibers, microfibers, and short-strand fibers having a length ranging between 200 μm and 600 μm;
   adding a catalyst to the filled resin;
   mixing the catalyst and the filled resin to create an uncured catalyzed, filled resin;
   adding the uncured catalyzed, filled resin to a mold; and
   allowing the uncured catalyzed, filled resin to harden in the mold.

2. The method of claim 1, wherein adding the uncured catalyzed, filled resin to the mold comprises injecting the uncured catalyzed, filled resin into the mold.

3. The method of claim 1, wherein adding the uncured catalyzed, filled resin to the mold comprises spraying the uncured catalyzed, filled resin into the mold.

4. The method of claim 3, wherein the mold is free of fiberglass reinforcements.

5. The method of claim 3, wherein the uncured catalyzed, filled resin is sprayed with a spray gun.

6. The method of claim 5, wherein the spray gun comprises a chopper gun.

7. The method of claim 6, further comprising adding glass fibers to the uncured catalyzed, filled resin with the chopper gun prior to spraying the uncured catalyzed, filled resin into the mold.

8. The method of claim 7, wherein withdrawing the filled resin comprises pumping the filled resin into a hose coupled to the chopper gun.

9. The method of claim 8, wherein adding the catalyst comprises introducing the catalyst to a flow of the filled resin within the hose.

10. The method of claim 9, wherein mixing the catalyst comprises using an inline mixer in a flow path of the filled resin within the hose.

11. The method of claim 10, wherein the catalyst comprises methyl ethyl ketone peroxide (MEKP).

12. The method of claim 10, wherein the catalyst comprises benzoyl peroxide (BPO).

13. The method of claim 10, wherein the catalyst comprises a thermoset resin initiator.

14. A method of applying resin, comprising:
   withdrawing a filled resin from a container, the filled resin comprising a flock fiber material, wherein the flock fiber material includes one or both of a natural flock fiber material and a synthetic flock fiber material, and wherein the natural flock fiber material and the synthetic flock fiber material include one or more of nanofibers, microfibers, and short-strand fibers having a length ranging between 200 μm and 600 μm;
   adding a catalyst to the filled resin;
   mixing the catalyst and the filled resin to create an uncured catalyzed, filled resin;
   spraying the uncured catalyzed, filled resin onto a surface; and
   allowing the uncured catalyzed, filled resin to harden.

15. The method of claim 14, wherein the mold is free of fiberglass reinforcements.

16. The method of claim 14, wherein the uncured catalyzed, filled resin is sprayed with a chopper gun.

17. The method of claim 16, further comprising adding glass fibers to the uncured catalyzed, filled resin with the chopper gun prior to spraying the uncured catalyzed, filled resin onto the surface.

18. The method of claim 14, wherein withdrawing the filled resin comprises pumping the filled resin into a hose coupled to the chopper gun.

19. The method of claim 14, wherein adding the catalyst comprises introducing the catalyst to a flow of the filled resin within a hose coupled to a spray gun.

20. The method of claim 14, wherein the catalyst comprises methyl ethyl ketone peroxide (MEKP).

21. The method of claim 14, wherein the catalyst comprises benzoyl peroxide (BPO).

22. The method of claim 14, wherein the catalyst comprises a thermoset resin initiator.

23. A method of making a molded part, comprising:
   pumping a filled resin from a container into a hose to create a flow of filled resin, the filled resin comprising a polyester resin and a flock fiber material, the hose having an end coupled to a spray gun, wherein the flock fiber material includes one or both of a natural flock fiber material and a synthetic flock fiber material, and wherein the natural flock fiber material and the synthetic flock fiber material include one or more of nanofibers, microfibers, and short-strand fibers having a length ranging between 200 μm and 600 μm;
   adding a catalyst to the flow of the filled resin;
   mixing the catalyst and the filled resin using an inline, static mixer coupled to the hose to create an uncured catalyzed, filled resin;
   pumping the uncured catalyzed, filled resin to the spray gun;
   spraying the uncured catalyzed, filled resin into an empty cavity of a mold; and
   allowing the uncured catalyzed, filled resin to harden in the mold.

24. The method of claim 23, wherein the catalyst comprises methyl ethyl ketone peroxide (MEKP).

25. The method of claim 23, wherein the catalyst comprises benzoyl peroxide (BPO).

26. The method of claim 23, wherein the catalyst comprises a thermoset resin initiator.

* * * * *